United States Patent [19]

Ewins, Jr. et al.

[11] 4,250,272

[45] Feb. 10, 1981

[54] ADHESIVE COMPOSITIONS

[75] Inventors: Earle E. Ewins, Jr., Houston, Tex.; Jr., deceased Cocker, late of Houston, Tex., by F. Ramona Coker, Legal representative

[73] Assignee: Shell Oil Company, Houston, Tex.

[21] Appl. No.: 38,036

[22] Filed: May 11, 1979

[51] Int. Cl.$^3$ .............................................. C08L 53/02
[52] U.S. Cl. .............................. 525/89; 260/336 AQ; 525/333; 526/339
[58] Field of Search ..................... 525/89, 99

[56] References Cited

U.S. PATENT DOCUMENTS

| 3,239,478 | 3/1966 | Harlan | 260/27 |
|---|---|---|---|
| 3,281,383 | 10/1966 | Zelinski et al. | 260/23.7 |
| 3,519,585 | 7/1970 | Miller | 525/89 |
| 3,577,398 | 5/1971 | Pace et al. | 260/85.3 |
| 3,817,953 | 6/1974 | Younger | 260/82 |
| 3,865,797 | 2/1975 | Joy | 260/82 |
| 3,893,986 | 7/1975 | Komai et al. | 260/80.7 |
| 3,932,328 | 1/1976 | Korpman | 260/27 BB |
| 4,104,327 | 8/1978 | Inoue et al. | 525/89 |
| 4,136,071 | 1/1979 | Korpman | 525/89 |

FOREIGN PATENT DOCUMENTS 1426497  2/1976  United Kingdom .

*Primary Examiner*—Stanford M. Levin
*Attorney, Agent, or Firm*—Dean F. Vance

[57] ABSTRACT

A process for selecting a $C_5$-based hydrocarbon tackifying resin to be used in an adhesive composition with a monoalkenyl arene conjugated diene block copolymer is disclosed. Pursuant to the selection process, a novel tackifying resin having an unobvious balance of properties is also disclosed, along with its combination with an elastomeric block copolymer in an adhesive composition.

4 Claims, No Drawings

ADHESIVE COMPOSITIONS

BACKGROUND OF THE INVENTION

Styrene-diene block copolymers have been formulated in the past to produce a number of types of adhesive compositions. The basic patent in this field, Harlan, U.S. Pat. No. 3,239,478, shows combinations of these block copolymers with tackifying resins and paraffinic extending oils to produce a wide spectrum of adhesives. While the basic synthetic elastomer has essentially remained the same since its introduction in the 1960's, there have been numerous patents issued on novel tackifying resins to be employed with the elastomer in adhesive compositions. The tackifying resins as proposed in these patents have varying compositions and property advantages. However, the fact has not been fully appreciated in the past that an improvement in one property, e.g., tack, may result in a detriment to another property, e.g., processibility. Further, while one adhesive consumer may desire adhesives possessing certain properties, e.g., high adhesive strength, another adhesive consumer may not desire the same property value. This lack of flexibility and knowledge concerning resin selection has frequently retarded the use of styrene-diene block copolymers in adhesive compositions.

SUMMARY OF THE INVENTION

The present invention broadly encompasses a process to be used in selecting a C$_5$-based hydrocarbon tackifying resin to be used in an adhesive composition with a monoalkenyl arene-conjugated diene block polymer. The selection process comprises (a) selecting the desired property values for the adhesive formulation, said values being selected from the group comprising hot melt viscosity, rolling back tack, holding power, and shear adhesion failure temperature, (b) determining the relationship between each specific property value and the individual characteristics of the tackifying resin by a regression analysis of actual adhesive formulations containing tackifying resins of varying characteristics, said characteristics being selected from the group comprising softening point, molecular weight, percent aromaticity, monomer type and relative amount, and parts of resin per hundred rubber employed in the adhesive formulation, and (c) selecting the resin based upon the desired property values for the adhesive formulation and the relationship between said property values and said resin characteristics.

The invention is not limited to the specific types of property values for the adhesive formulation, nor is the invention limited to the specified resin characteristics listed above. However, the property values and characteristics listed above are typically the ones of most significance and importance.

Through the analytical process of the present invention, it is possible to determine the effect of certain characteristics of a type of tackifying resin on the adhesive formulation properties. This relationship, as shown in Illustrative Embodiment I, may be expressed as an equation or equations derived from a regression analysis of analytical data. Alternatively, the relationship may be expressed in qualitative terms. For example, after examining adhesives formulations based on a piperylene-isobutylene-alphamethylstyrene tackifying resin, the relationships listed in Table I were found. In Table I, the effect of the resin characteristics selected from the group comprising softening point, molecular weight, and aromaticity an adhesion formulation properties selected from the group comprising hot melt viscosity at 176.7° C., shear adhesion failure temperature, rolling ball tack, holding power to kraft and steel and the critical tack level ($T_c$=maximum resin level while maintaining an RBT of about 5 cm) are presented. For example, at constant molecular weight and aromaticity, for every 1° centigrade increase in softening point for the resin, one can expect a 1 percent increase in hot melt viscosity, a 0.2° F. increase in shear adhesion failure temperature, a 1 cm increase in rolling ball tack, and so on. The results from the table are discussed further in the Illustrative Embodiments.

By employing the process of the present invention, an adhesive consumer may select the specific resin needed to satisfy the property values that are required within the constraints of the equipment and coating technique that is employed.

TABLE I

EFFECT OF RESIN STRUCTURE AND PHYSICAL PROPERTIES ON PRESSURE SENSATIVE ADHESIVE PROPERTIES

| | H.M. Visc. | SAFT | RBTack | H. Power-K | H. Power-S | Tc |
|---|---|---|---|---|---|---|
| RESIN | | | | | | |
| Softening Point, ↑ 1° C. | ↑ 1% | ↑ 0.2° F. | ↑ 1cm | ↑ 2% | ↑ 2% | ↓ 2 PHR |
| Mol. Num. Avg., ↑ 100Mn | ↑ 3% | ↓ 0.6° F. | ↑ 1cm | ↓ 2% | ↑ 2% | ↓ 7 PHR |
| Aromaticity ↑ | | | | | | |
| 0–12%, ↑ 1% | ↓ 3% | ↓ 0.6° F. | ↑ 0.2 cm | ↓ 1% | ↑ 5% | ↓ 0.4 PHR |
| >12%, ↑ 1% | → | ↓ 0.6° F. | ↑ 0.2cm | ↓ 1% | ↑ 5% | ↓ 0.4PHR |

↑ = INCREASE IN VALUE
↓ = DECREASE IN VALUE
→ = LITTLE OR NO CHANGE IN VALUE

Also included in the present invention is a novel tackifying resin and adhesive formulation derived by use of the selection process described above. The tackifying resin is derived from a major amount of dimerized piperylene, a small amount of (1 to 8 percent) isobutylene or di-isobutylene, and between about 8 and 12 percent by weight aromatics. Preferred aromatic monomers employed in preparing the resin include alphamethyl styrene, indenes, and vinyl toluenes, with alphamethyl styrene being the most preferred. The proposed tackifying resin has a softening point of 70° C. to 110° C. and a molecular weight of between about 1,000 and about 1,600. In a specific embodiment, the tackifying resin comprises 11 percent alphamethyl styrene, 5 percent diisobutylene, and 84 percent dimerized piperylene, has a softening point of 85° C. and a molecular weight of 1,400.

DETAILED DESCRIPTION OF THE INVENTION

There are at least two basic components in the adhesive formulations relative to the present invention—an elastomer and a tackifying resin. Other components, such as plasticizing oils, are also included as defined hereinafter. The elastomer component is selected from the group comprising linear or radial ABA-type block copolymers and linear or radial ABA-type block copolymers plus simple AB two block copolymers. The A blocks in the copolymers are blocks of monoalkenyl arenes. Preferably, the A blocks are polymer blocks of styrene. Other useful monoalkenyl arenes include alphamethyl styrene, tert-butyl styrene, and other ring-alkylated styrenes. The B blocks in the copolymers are blocks of conjugated dienes. Preferred dienes include butadiene and isoprene with isoprene being the most preferred.

The linear ABA type block copolymer is described in Harlan, U.S. Pat. No. 3,239,478. Typical structures include polystyrene-polyisoprene-polystyrene and polystyrene-polybutadiene-polystyrene, with the former being most preferred. The radial ABA type block copolymers are described in U.S. Pat. No. 3,281,383 and have the formula $(AB)_xBA$ where x varies from 2 to 15, preferably 2 to 6. The weight percentage of A blocks in the linear or radial ABA type block copolymers is typically between 8 and 65 percent, preferably between about 10 percent and about 30 percent.

The AB two block copolymers typically have a structure polystyrene-polyisoprene or polystyrene-polybutadiene with the former being preferred. These block copolymers are described in U.S. Pat. Nos. 3,787,531, 3,519,585, and 4,136,071. A method for producing a mixture of ABA type and AB two block type block copolymers is described in U.S. Pat. No. 4,096,203.

The average molecular weights of each of the blocks may be varied as desired. The monoalkenyl arene polymer blocks preferably have average molecular weights between about 3,000 and 125,000, more preferably between about 8,000 and 40,000. The elastomeric conjugated diene polymer blocks preferably have average molecular weights between about 15,000 and about 250,000, more preferably between about 25,000 and about 175,000. The average molecular weights of the monoalkenyl arene polymer end blocks are determined by gel permeation chromotography, whereas the monoalkenyl arene polymer content of the block copolymer is measured by infrared spectroscopy of the finished block polymer.

The relative amounts of ABA type and AB type block copolymers are presented in parts by weight below:

|          | PREFERRED | MOST PREFERRED |
| -------- | --------- | -------------- |
| ABA type | 40 to 95  | 45 to 80       |
| AB type  | 60 to 5   | 55 to 20       |

The block copolymers useful in the compositions of this invention may also be hydrogenated either selectively, randomly, or completely. Selected conditions may be employed, for example, to hydrogenate the elastomeric diene center block while not so modifying the monoalkenyl arene polymer blocks. Two examples of hydrogenated polymers are polyvinylcyclohexane-hydrogenated polyisoprene-polyvinylcyclohexane and polystyrene-hydrogenated polyisoprene-polystyrene. Preferably, blocks A are characterized in that no more than about 25 percent of the original aromatic double bonds are reduced by hydrogenation while blocks B are characterized by having at least 75 percent of the aliphatic double bonds reduced by hydrogenation. See generally U.S. Pat. No. 3,595,942.

The other component in the adhesive formulations contemplated herein is a $C_5$ hydrocarbon-based tackifying resin. These resins are synthetic hydrocarbon resins made by polymerizing mixtures of unsaturated monomers (olefins, diolefins, and aromatic vinyl compounds) that are obtained as byproducts from the cracking of natural gas liquids, gas oil, or petroleum naphthas. The resins are relatively low in molecular weight and include both liquids and solids.

The tackifying resins covered by the present invention are typically prepared by polymerization of a mixed stream of monomers in the presence of a Friedel Crafts type catalyst. The $C_5$ stream used herein is typically derived from a thermally or steam cracked naphtha or gas oil and typically boils in the range of 10° to 80° C. It may contain the following hydrocarbons: isoprene, cis and transpiperylene (1,3 pentadiene), n-pentane, isopentane, pentene-1, cyclopentadiene, dicyclopentadiene, transpentene-2, 2-methylbutene-2, cyclopentene, cyclopentane, and benzene. In addition, some $C_4$ hydrocarbons may also be present. If desired, this $C_5$ stream may be further refined before being polymerized, e.g., the isoprene may be removed by distillation and/or the monocyclopentadiene may be dimerized. In addition, a piperylene-rich stream may be obtained by an extractive distillation process. The piperylene-rich stream typically comprises about 75 percent or higher piperylene and about 25 percent or less cyclopentene. Part of this cyclopentene will polymerize with the piperylene in the resin. Further, the piperylene component may be dimerized prior to polymerization. Other monomer streams may also be added, such as aromatic streams containing alphamethyl styrene, indenes, or vinyl toluene or the stream may be a $C_4$ olefin stream. The selection process of the present invention is not limited to any particular monomers, source of monomers, or polymerization process. Various tackifying resins and polymerization processes are well known in the art. Accordingly, it is not considered necessary to include the details of polymerization here. Representative patents on preparation of tackifying resins include U.S. Pat. Nos. 3,577,398, 3,817,953, 3,865,797, 3,893,986, 3,932,328, and 3,966,690 which patents are herein incorporated by reference.

The amount of tackifying resin employed in the adhesive compositions of the present invention varies from about 20 to 300 parts by weight per hundred parts by weight rubber (phr), preferably between about 50 and about 150 phr.

The present invention also comprises the adhesive composition comprising the block copolymer plus the tackifying resin. Other components may also be present. The adhesive compositions of the present invention also may contain plasticizers such as rubber extending or compounding oils. These rubber compounding oils are well known in the art and include both high saturate content and high aromatic content oils. The amount of rubber compounding oil employed varies from about 0 to about 100 phr, preferably about 10 to about 60 phr.

Optionally, an arene-block-compatible resin may be employed, said compatibility being judged by the method disclosed in U.S. Pat. No. 3,917,607. Normally, the resin should have a softening point above about 100° C., as determined by ASTM Method E-28, using a ring and ball apparatus. Mixtures of arene-block-compatible resins having high and low softening points may also be used. Useful resins include coumaroneidene resins, polystyrene resins, vinyl toluene-alphamethyl styrene copolymers, and polyindene resins. Much preferred is a coumarone-indene resin. The amount of arene-block-compatible resin varies from about 0 to about 200 phr.

The compositions of this invention may be modified with supplementary materials, including pigments, fillers, and the like, as well as stabilizers and oxidation inhibitors. Stabilizers and oxidation inhibitors are typically added to the commercially available compounds in order to protect the polymers against degradation during preparation and use of the adhesive composition. Combinations of stabilizers are often more effective due to the different mechanisms of degradation possible in various polymer systems. Certain hindered phenols, organometallic compounds, aromaticamines, and sulfur compounds are useful for this purpose. Especially effective types of these materials include the following:

(a) benzothiazoles, such as 2-(dialkyl-hydroxybenzyl-thio)benzothiazoles
(b) esters of hydroxybenzyl alcohols, such as benzoates, phthalates, stearates, adipates, or acrylates of 3,5-dialkyl-1-hydroxybenzyl alcohols
(c) stannous phenyl catecholates
(d) zinc dialkyl dithiocarbamates
(e) alkyl phenols, elg., 2,6-di-tert-butyl-4-methyl phenol
(f) dilaurylthio-dipropionate Examples of commercially available antioxidants are "Ionox 220" 4,4-methylene-bis (2,6-di-t-butyl-phenol), "Ionox 330" 3,4,6-tris (3,5-di-t butyl-p-hydroxybenzyl)-p-cresol, "Naugawhite" alkylated bisphenol, "Butyl Zimate" zinc dibutyl dithiocarbamate, and "Agerite Geltrol" alkylated-arylated bis-h=phenolic phosphite. From about 0.01 percent to about 5.0 percent by weight of one or more antioxidants is generally added to the adhesive composition.

The adhesive compositions of the present invention may be prepared by either blending block copolymers, oil, and tackifying resin in a solvent, such as toluene, and removing the solvent by a stripping or drying operation or they may be prepared by merely mixing the components at an elevated temperature, e.g., at about 150° C. (hot melt). In addition, if desired, the adhesive compositions may be cured, for example, by known heat activated or irradiation techniques with known curing agents.

The invention is further illustrated by means of the following illustrative embodiment which is given for the purpose of illustration only and is not meant to limit the invention to the particular reactants and amounts disclosed.

ILLUSTRATIVE EMBODIMENT I

In Illustrative Embodiment I, the effect of varying resin characteristics on adhesive formulations was investigated. Sixteen different tackifying resins were employed in sixty different adhesive formulations. These tackifying resins were prepared from dimerized piperylene, di-isobutylene, and alphamethylstyrene. The resin itself was characterized by softening point (sp), number average molecular weight ($m_n$), and weight percent aromatics (%a).

The tackifying resins were evaluated in adhesive formulations with a block copolymer comprising a mixture of about 85 parts by weight of a styrene-isoprene-styrene linear block copolymer and 15 parts by weight of styrene-isoprene two block copolymer. In runs 1–44, the adhesive formulations did not contain any plasticizing oil while in runs 45–60, there was added about 20 parts of oil per 100 parts of the total block copolymer. The amount of tackifying resin was varied from 40 phr to 160 phr. All samples were prepared by the solution casting of the films on mylar at dry film thickness of approximately 1.5 mil.

The adhesives were evaluated according to the following tests: Hot Melt Viscosity (HMVis), ASTM D-3236, Rolling Ball Tack (RBT), PSTC 6, Shear Adhesion Failure Temperature to Kraft and Mylar ($SAFT_k$ and $SAFT_m$), POLYKEN® Probe Tack (PPT), ASTM D-2979, and Holding Power to Kraft and Steel ($HP_k$ and $HP_s$), PSTC 7. The SAFT test consists of finding the temperature at which a $1'' \times 1''$ lap shear joint fails with a 1 kilogram (kg) load. A lap shear bond to Mylar or Kraft paper with a one inch by one inch overlap is prepared under a tensile load of 1 kg in a cabinet whose temperature is raised at 40° F./hr. SAFT is the temperature at which the bond completely fails (TRM-6006-139-73).

The various characteristics and properties are presented below in Table II.

The data from Table II was then analyzed in a multiple regression. It became readily apparent that aromaticity level was highly significant, and that resins having aromaticities up to about 12 percent were distinct from resins having aromaticities about 10 to 12 percent. In other words, the critical aromaticity level was about 10 to 12 percent. Accordingly, the various regression equations were prepared covering all samples, covering resins having aromaticities of 1.5 to 12.8 percent and covering resins having aromaticities of 11.8 to 49.3 percent.

The effect of resin characteristics on hot melt viscosity (at 350° F. in centipoise units) is presented in the following twelve equations listed in Table III:

TABLE II

| RUN NUMBER | RESIN NUMBER | RESIN CHARACTERISTICS | | | ADHESIVE CHARACTERISTICS PHR | | ADHESIVE PROPERTIES | | | | | | |
|---|---|---|---|---|---|---|---|---|---|---|---|---|---|
| | | SP | MN | % A | PHR | OIL | M VIS | RBT | $SAFT_R$ | $SAFT_M$ | PPT | $HP_K$ | $HP_S$ |
| 1 | 1 | 107.0 | 1770 | 12.8 | 100 | 0 | 198000 | 31.0 | 176 | 225 | .92 | 1600 | 11000 |
| 2 | 2 | 99.0 | 1450 | 22.6 | 100 | 0 | 164000 | 9.7 | 165 | 203 | 1.27 | 1500 | 11000 |
| 3 | 3 | 93.5 | 1250 | 32.3 | 100 | 0 | 134000 | 3.6 | 162 | 193 | 1.13 | — | — |
| 4 | 4 | 87.5 | 1030 | 42.3 | 100 | 0 | 137000 | 1.7 | 145 | 172 | 1.03 | — | — |
| 5 | 5 | 81.5 | 900 | 49.3 | 100 | 0 | 126000 | 3.7 | 130 | 162 | .92 | — | — |

TABLE II-continued

| RUN NUMBER | RESIN NUMBER | RESIN CHARACTERISTICS | | | ADHESIVE CHARACTERISTICS | | ADHESIVE PROPERTIES | | | | | | |
|---|---|---|---|---|---|---|---|---|---|---|---|---|---|
| | | SP | MN | % A | PHR | PHR OIL | M VIS | RBT | $SAFT_R$ | $SAFT_M$ | PPT | $HP_K$ | $HP_S$ |
| 6 | 6 | 95.5 | 1610 | 24.0 | 100 | 0 | 157000 | 8.7 | 165 | 202 | 1.10 | 1800 | 9000 |
| 7 | 7 | 84.5 | 1240 | 33.0 | 100 | 0 | 125000 | 3.0 | 145 | 180 | 1.00 | — | — |
| 8 | 8 | 100.0 | 1350 | 29.5 | 100 | 0 | 160000 | 4.2 | 156 | 195 | 1.18 | 5400 | 11000 |
| 9 | 9 | 97.0 | 1390 | 20.4 | 100 | 0 | 155000 | 2.8 | 171 | 203 | 1.18 | 4450 | 11000 |
| 10 | 10 | 98.0 | 1440 | 11.8 | 100 | 0 | 156000 | 5.2 | 176 | 215 | 1.21 | 2400 | 11000 |
| 11 | 12 | 91.0 | 1210 | 29.2 | 100 | 0 | 132000 | 2.4 | 160 | 193 | 1.01 | — | — |
| 12 | 13 | 82.0 | 1110 | 28.2 | 100 | 0 | 101000 | 1.7 | 155 | 192 | 1.05 | 1000 | 5600 |
| 13 | 14 | 68.5 | 980 | 28.6 | 100 | 0 | 89100 | 1.1 | 152 | 189 | .72 | 150 | 530 |
| 14 | 4 | 87.5 | 1030 | 42.3 | 120 | 0 | 93600 | 2.6 | 133 | 162 | 1.39 | — | — |
| 15 | 7 | 84.5 | 1240 | 33.0 | 120 | 0 | 86400 | 4.0 | 136 | 165 | 1.29 | — | — |
| 16 | 9 | 97.0 | 1390 | 20.4 | 120 | 0 | 102200 | 8.4 | 156 | 189 | 1.42 | — | — |
| 17 | 10 | 98.0 | 1440 | 11.8 | 120 | 0 | 103400 | 16.0 | 161 | 202 | 1.23 | — | — |
| 18 | 12 | 91.0 | 1210 | 29.2 | 120 | 0 | 92800 | 8.0 | 149 | 180 | 1.35 | — | — |
| 19 | 13 | 82.0 | 1110 | 28.2 | 120 | 0 | 73900 | 1.3 | 154 | 178 | 1.25 | — | — |
| 20 | 14 | 68.5 | 980 | 28.6 | 120 | 0 | 63400 | 1.1 | 145 | 168 | .97 | — | — |
| 21 | 1 | 107.0 | 1770 | 12.8 | 80 | 0 | 291000 | 11.0 | 175 | 220 | .65 | 4400 | 11000 |
| 22 | 4 | 87.5 | 1030 | 42.3 | 140 | 0 | 66500 | 4.4 | 132 | 154 | 1.18 | — | — |
| 23 | 9 | 87.5 | 1030 | 42.3 | 160 | 0 | 46000 | 31.0 | 120 | 151 | 1.46 | 200 | 810 |
| 24 | 7 | 84.5 | 1240 | 33.0 | 140 | 0 | 62100 | 6.3 | 132 | 157 | 1.16 | — | — |
| 25 | 7 | 84.5 | 1240 | 33.0 | 160 | 0 | 46000 | 31.0 | 127 | 153 | 1.40 | 300 | 1030 |
| 26 | 8 | 100.0 | 1350 | 29.5 | 140 | 0 | 77600 | 31.0 | 138 | 173 | .75 | — | — |
| 27 | 13 | 82.0 | 1110 | 28.2 | 140 | 0 | 62600 | 1.8 | 138 | 166 | 1.33 | — | — |
| 28 | 13 | 82.0 | 1110 | 28.2 | 160 | 0 | 42000 | 3.1 | 138 | 162 | 1.62 | 780 | 460 |
| 29 | 14 | 68.5 | 980 | 28.6 | 140 | 0 | 46100 | 1.2 | 135 | 157 | .82 | — | — |
| 30 | 14 | 68.5 | 980 | 28.6 | 160 | 0 | 29200 | 1.5 | 132 | 158 | 1.30 | 190 | 105 |
| 31 | 11 | 104.5 | 1650 | 1.5 | 100 | 0 | 288000 | 18.2 | 180 | 227 | 1.16 | — | — |
| 32 | 15 | 92.0 | 1670 | 2.4 | 100 | 0 | 211000 | 3.4 | 188 | 224 | 1.07 | 2700 | 1300 |
| 33 | 16 | 86.5 | 1590 | 4.1 | 100 | 0 | 199000 | 3.0 | 185 | 220 | 1.08 | — | — |
| 34 | 11 | 104.5 | 1650 | 1.5 | 40 | 0 | 1753000 | 2.0 | 197 | 246 | .65 | — | — |
| 35 | 11 | 104.5 | 1650 | 1.5 | 60 | 0 | 754000 | 3.2 | 191 | 240 | .76 | — | — |
| 36 | 11 | 104.5 | 1650 | 1.5 | 80 | 0 | 425000 | 3.9 | 190 | 241 | 1.04 | — | — |
| 37 | 15 | 92.0 | 1670 | 2.4 | 40 | 0 | 1122000 | 6.1 | 198 | 246 | .46 | — | — |
| 38 | 15 | 92.0 | 1670 | 2.4 | 60 | 0 | 592000 | 2.7 | 192 | 236 | .75 | — | — |
| 39 | 15 | 92.0 | 1670 | 2.4 | 80 | 0 | 345000 | 3.9 | 190 | 226 | .75 | — | — |
| 40 | 15 | 92.0 | 1670 | 2.4 | 120 | 0 | 166000 | 9.6 | 170 | 221 | 1.33 | — | — |
| 41 | 16 | 86.5 | 1590 | 4.1 | 40 | 0 | 1112000 | 5.9 | 193 | 238 | .64 | — | — |
| 42 | 16 | 86.5 | 1590 | 4.1 | 60 | 0 | 544000 | 2.9 | 192 | 234 | .75 | — | — |
| 43 | 16 | 86.5 | 1590 | 4.1 | 80 | 0 | 292000 | 2.5 | 192 | 229 | .91 | — | — |
| 44 | 16 | 86.5 | 1590 | 4.1 | 120 | 0 | 133000 | 5.0 | 168 | 219 | 1.45 | — | — |
| 45 | 1 | 107.0 | 1770 | 12.8 | 140 | 20 | 39700 | 18.0 | 158 | 190 | 1.38 | 800 | 3500 |
| 46 | 2 | 99.0 | 1450 | 22.6 | 140 | 20 | 47700 | 2.4 | 151 | 173 | 1.39 | 260 | 730 |
| 47 | 3 | 93.5 | 1250 | 32.3 | 140 | 20 | 38400 | 2.6 | 138 | 164 | 1.28 | 170 | 370 |
| 48 | 4 | 87.5 | 1030 | 42.3 | 140 | 20 | 34900 | 2.2 | 120 | 154 | 1.13 | 110 | 410 |
| 49 | 5 | 81.5 | 900 | 49.3 | 120 | 20 | 31700 | 1.3 | 104 | 141 | .98 | 30 | 125 |
| 50 | 6 | 95.5 | 1610 | 24.0 | 140 | 20 | 40500 | 8.5 | 149 | 174 | 1.22 | 240 | 1200 |
| 51 | 7 | 84.0 | 1240 | 33.0 | 140 | 20 | 27600 | 3.9 | 131 | 155 | 1.00 | 60 | 150 |
| 52 | 8 | 100.0 | 1350 | 29.5 | 140 | 20 | 40600 | 31.0 | 142 | 174 | .76 | 215 | 455 |
| 53 | 9 | 97.0 | 1390 | 20.4 | 140 | 20 | 40800 | 11.0 | 147 | 178 | 1.24 | 100 | 205 |
| 54 | 10 | 98.0 | 1440 | 11.8 | 140 | 20 | 44000 | 12.5 | 156 | 189 | 1.30 | 150 | 260 |
| 55 | 11 | 104.5 | 1650 | 1.5 | 140 | 20 | 59500 | 13.5 | 160 | 203 | 1.45 | 450 | 580 |
| 56 | 12 | 91.0 | 1210 | 29.2 | 140 | 20 | 35400 | 7.9 | 144 | 174 | 1.15 | 75 | 140 |
| 57 | 13 | 82.0 | 1110 | 28.2 | 140 | 20 | 30700 | 1.2 | 149 | 164 | .84 | 45 | 90 |
| 58 | 14 | 68.5 | 980 | 28.6 | 140 | 20 | 26000 | .8 | 138 | 157 | .67 | 5 | 7 |
| 59 | 15 | 92.0 | 1670 | 2.4 | 140 | 20 | 48400 | 1.7 | 163 | 194 | 1.16 | 150 | 180 |
| 60 | 16 | 86.5 | 1590 | 4.1 | 140 | 20 | 41000 | 1.1 | 155 | 190 | 1.00 | 75 | 110 |

TABLE III

| $R^2$ | EQUATION | |
|---|---|---|
| | Log HMV | All Samples |
| .971 | (1) | $= 5.8 + .0058(sp) - .00089 \left(\frac{mn}{1,000}\right) - .0046(arom) - .010(phr) - .012(oil)$ |
| .958 | (2) | $= 5.8 + .0053(sp) + .023 \left(\frac{mn}{1,000}\right) - .0051(arom) - .010(phr)$ |
| .775 | (3) | $= 4.6 + .0058(sp) + .078 \left(\frac{mn}{1,000}\right) - .0035(arom)$ |
| .891 | (4) | $= 4.1 + .0076(sp) - .063 \left(\frac{mn}{1000}\right) - .0036(arom)$ |
| | Log HMV | 1.5 to 12.8 Percent Aromaticity |

TABLE III-continued

| $R^2$ | EQUATION | |
|---|---|---|
| .989 | (5) | $= 5.94 + .0064(sp) + .0058 (\frac{mn}{1,000}) - .015(arom) - .011(phr) - .0091(oil)$ |
| .979 | (6) | $= 6.0 + .0061(sp) + .010 (\frac{mn}{1,000}) - .019(arom) - .011(phr)$ |
| .956 | (7) | $= 4.5 + .0067(sp) + .15 (\frac{mn}{1,000}) - .017(arom)$ |
| .990 | (8) | $= 4.0 + .0075(sp) + .0078 (\frac{mn}{1,000}) - .0086(arom)$ |
| | Log HMV | 11.8 to 49.3 Percent Aromaticity |
| .991 | (9) | $= 5.1 + .0075(sp) + .072 (\frac{mn}{1,000}) + .0012(arom) - .0075(phr) - .014(oil)$ |
| .991 | (10) | $= 5.0 + .0068(sp) + .15 (\frac{mn}{1,000}) + .0024(arom) - .0075(phr)$ |
| .938 | (11) | $= 4.2 + .0076(sp) + .12 (\frac{mn}{1,000}) + .0024(arom)$ |
| .903 | (12) | $= 3.9 + .0085(sp) - .064 (\frac{mn}{1,000}) - .0015(arom)$ |

Each equation enables one to plug in various resin characteristics and obtain a value for the log of the hot melt viscosity. The standard confidence factor, $R^2$, is also included for each equation. Equations (1), (5), and (9) cover adhesives containing oil while equations (2), (6), and (10) cover adhesives containing no oil. Equations (3), (7), and (11) cover adhesives at a constant 100 phr resin while equations (4), (8), and (12) cover adhesive at a constant 140 phr resin and 20 phr oil. Similar equations can be written for other properties that are analyzed. By solving these and similar equations, an adhesive customer may select an optimum resin for his individual needs.

We claim as our invention:

1. An adhesive composition comprising 100 parts by weight of a block copolymer component and 20 to 300 parts by weight of a tackifying resin component wherein:
    (a) said block copolymer component comprises a mixture of a linear or radial ABA type block copolymer and an AB two block copolymer where the A blocks are polystyrene blocks and the B blocks are polybutadiene or polyisoprene blocks; and
    (b) said tackifying resin component has a softening point of 70° to 100° C., a number average molecular weight of 1,000 to 1,600, and comprises from about 80 to 91 percent by weight units derived from piperylene, from about 1 to about 8 percent by weight units derived from isobutylene and from about 8 to about 12 percent by weight units derived from alphamethyl styrene.

2. The adhesive composition of claim 1 wherein said tackifying resin has a softening point of about 85° C., a number average molecular weight of about 1,400, and comprises about 84 percent by weight units derived from piperylene, about 11 percent by weight units derived from alphamethyl styrene, and about 5 percent by weight units derived from isobutylene.

3. The adhesive composition of claim 1 wherein said block copolymer component comprises 40 to 95 parts by weight of the ABA-type block copolymer and 60 to 5 parts by weight of the AB-type block copolymer.

4. An adhesive composition according to claim 1 wherein said B blocks are polyisoprene blocks.

* * * * *

UNITED STATES PATENT AND TRADEMARK OFFICE
CERTIFICATE OF CORRECTION

PATENT NO. : 4,250,272

DATED : February 10, 1981

INVENTOR(S) : Earle E. Ewins, Jr. and George T. Coker, Jr.

It is certified that error appears in the above-identified patent and that said Letters Patent are hereby corrected as shown below:

On the title page, the inventors reading

Earle E. Ewins, Jr., Houston, Tex.;
Jr., deceased Cocker, late of
Houston, Tex., by F. Ramona Coker,
Legal representative should read Earle E. Ewins, Jr., Houston, Tex.;
George T. Coker, Jr., deceased, late
of Houston, Tex.; by F. Ramona Coker,
Legal representative Signed and Sealed this Ninth Day of June 1981

[SEAL]

Attest:

RENE D. TEGTMEYER

Attesting Officer

Acting Commissioner of Patents and Trademarks